US010642853B2

United States Patent
Mallah et al.

(10) Patent No.: US 10,642,853 B2
(45) Date of Patent: May 5, 2020

(54) AUTOMATICALLY GENERATING GRAPHICAL DATA DISPLAYS BASED ON STRUCTURED DESCRIPTIONS

(71) Applicant: PALANTIR TECHNOLOGIES INC., Palo Alto, CA (US)

(72) Inventors: Amr Al Mallah, New York, NY (US); Alexander Visbal, Brooklyn, NY (US); David Philipson, Palo Alto, CA (US); James Thompson, London (GB); Natasha D'Souza, San Francisco, CA (US); Ryan Xie, Redwood City, CA (US); Wayne Chen Spiegel, San Francisco, CA (US)

(73) Assignee: Palantir Technologies Inc., Palo Alto, AZ (US)

( * ) Notice: Subject to any disclaimer, the term of this patent is extended or adjusted under 35 U.S.C. 154(b) by 84 days.

(21) Appl. No.: 15/711,712

(22) Filed: Sep. 21, 2017

(65) Prior Publication Data

US 2019/0079980 A1 Mar. 14, 2019

Related U.S. Application Data

(63) Continuation of application No. 15/701,579, filed on Sep. 12, 2017, now abandoned.
(Continued)

(51) Int. Cl.
*G06F 16/248* (2019.01)
*G06F 9/451* (2018.01)
(Continued)

(52) U.S. Cl.
CPC .......... *G06F 16/248* (2019.01); *G06F 3/0481* (2013.01); *G06F 8/38* (2013.01); *G06F 9/451* (2018.02); *G06F 3/0482* (2013.01)

(58) Field of Classification Search
None
See application file for complete search history.

(56) References Cited

U.S. PATENT DOCUMENTS

| 5,021,792 A | 6/1991 | Hwang |
| 5,555,503 A | 9/1996 | Kyrtsos et al. |

(Continued)

FOREIGN PATENT DOCUMENTS

| EP | 2 341 691 A1 | 7/2011 |
| EP | 2400448 | 12/2011 |

(Continued)

OTHER PUBLICATIONS

"Freshdesk Notifications and other settings" FreshWorks https://support.freshdesk.com/support/solutions/articles/206766-notifications-and-other-settings (Year: 2016).*

(Continued)

*Primary Examiner* — Beau D Spratt
(74) *Attorney, Agent, or Firm* — Hickerman Palermo Becker Bingham LLP

(57) ABSTRACT

In one embodiment, a data processing method comprises, using a first computer, in response to detecting a change in a data source: automatically generating a dataset comprising a subset of data from the data source, generating a unique dataset identifier, and associating the dataset identifier with the dataset in digital data storage; generating a display description that comprises: the dataset identifier; and for each particular graphical data display widget among one or more graphical data display widgets, instructions that specify a widget type, an order and one or more widget configuration values for the particular graphical data display widget; transmitting the display description to a second computer.

14 Claims, 7 Drawing Sheets

Related U.S. Application Data

(60) Provisional application No. 62/434,358, filed on Dec. 14, 2016.

(51) Int. Cl.
*G06F 3/0481* (2013.01)
*G06F 8/38* (2018.01)
*G06F 3/0482* (2013.01)

(56) References Cited

U.S. PATENT DOCUMENTS

| | | |
|---|---|---|
| 5,670,987 A | 9/1997 | Doi et al. |
| 6,141,659 A | 10/2000 | Barker et al. |
| 6,189,003 B1 | 2/2001 | Leal |
| 6,272,489 B1 | 8/2001 | Rauch et al. |
| 6,642,945 B1 | 11/2003 | Sharpe |
| 7,188,100 B2 | 3/2007 | De Bellis et al. |
| 7,383,053 B2 | 6/2008 | Kent et al. |
| 7,523,100 B1 | 4/2009 | Bionda et al. |
| 7,529,734 B2 | 5/2009 | Dirisala |
| 7,652,622 B2 | 1/2010 | Hansen et al. |
| 7,706,817 B2 | 4/2010 | Bamrah et al. |
| 7,725,547 B2 | 5/2010 | Albertson et al. |
| 7,747,648 B1 | 6/2010 | Kraft et al. |
| 7,945,470 B1 | 5/2011 | Cohen et al. |
| 8,028,894 B2 | 10/2011 | Lapstun et al. |
| 8,402,047 B1 | 3/2013 | Mangini et al. |
| 8,521,135 B2 | 8/2013 | Cryderman |
| 8,739,059 B2 | 5/2014 | Rabenold et al. |
| 8,762,870 B2 | 6/2014 | Robotham et al. |
| 8,849,254 B2 | 9/2014 | Bolon |
| 9,037,407 B2 | 5/2015 | Thompson |
| 9,123,086 B1 | 9/2015 | Freeland et al. |
| 9,262,529 B2 | 2/2016 | Colgrove et al. |
| 9,275,069 B1 | 3/2016 | Garrod et al. |
| 9,301,103 B1 | 3/2016 | Thompson |
| 9,313,233 B2 | 4/2016 | Sprague et al. |
| 2003/0152277 A1 | 8/2003 | Hall et al. |
| 2003/0227746 A1 | 12/2003 | Sato |
| 2004/0203380 A1 | 10/2004 | Hamdi et al. |
| 2005/0125436 A1 | 6/2005 | Mudunuri et al. |
| 2005/0143096 A1 | 6/2005 | Boesch |
| 2005/0210409 A1 | 9/2005 | Jou |
| 2006/0116991 A1 | 6/2006 | Calderwood |
| 2006/0206235 A1 | 9/2006 | Shakes et al. |
| 2006/0250764 A1 | 11/2006 | Howarth et al. |
| 2007/0043744 A1 | 2/2007 | Carro |
| 2007/0118547 A1 | 5/2007 | Gupta et al. |
| 2007/0130541 A1* | 6/2007 | Louch .................... G06F 9/451 |
| | | 715/804 |
| 2007/0198571 A1 | 8/2007 | Ferguson et al. |
| 2007/0250491 A1 | 10/2007 | Olszak et al. |
| 2008/0007618 A1 | 1/2008 | Yuasa |
| 2008/0034314 A1* | 2/2008 | Louch ...................... G06F 8/60 |
| | | 715/778 |
| 2008/0227473 A1 | 9/2008 | Haney |
| 2008/0252419 A1 | 10/2008 | Batchelor et al. |
| 2009/0005070 A1 | 1/2009 | Forstall et al. |
| 2009/0138790 A1 | 5/2009 | Larcheveque et al. |
| 2009/0143052 A1 | 6/2009 | Bates et al. |
| 2009/0156231 A1 | 6/2009 | Versteeg et al. |
| 2009/0265105 A1 | 10/2009 | Davis et al. |
| 2009/0315679 A1 | 12/2009 | Bauchot et al. |
| 2010/0058212 A1 | 3/2010 | Belitz et al. |
| 2010/0073315 A1 | 3/2010 | Lee et al. |
| 2010/0082842 A1 | 4/2010 | Lavrov et al. |
| 2010/0121817 A1 | 5/2010 | Meyer et al. |
| 2010/0138295 A1 | 6/2010 | Caron et al. |
| 2010/0173619 A1 | 7/2010 | Hua et al. |
| 2010/0185984 A1 | 7/2010 | Wright et al. |
| 2010/0191884 A1 | 7/2010 | Holenstein et al. |
| 2010/0214117 A1 | 8/2010 | Hazzani |
| 2010/0223543 A1 | 9/2010 | Marston |
| 2010/0281458 A1 | 11/2010 | Paladino et al. |
| 2010/0306713 A1 | 12/2010 | Geisner et al. |
| 2011/0022312 A1 | 1/2011 | McDonough et al. |
| 2011/0093440 A1 | 4/2011 | Asakura et al. |
| 2011/0158469 A1 | 6/2011 | Mastykarz |
| 2011/0191316 A1* | 8/2011 | Lai ......................... G06F 16/00 |
| | | 707/706 |
| 2011/0202557 A1 | 8/2011 | Atsmon et al. |
| 2011/0295695 A1 | 12/2011 | Ishihara et al. |
| 2011/0310005 A1 | 12/2011 | Chen et al. |
| 2012/0010812 A1 | 1/2012 | Thompson |
| 2012/0015673 A1 | 1/2012 | Klassen et al. |
| 2012/0032975 A1 | 2/2012 | Koch |
| 2012/0036434 A1 | 2/2012 | Oberstein |
| 2012/0150578 A1 | 6/2012 | Mangat et al. |
| 2012/0166929 A1 | 6/2012 | Henderson et al. |
| 2012/0216106 A1 | 8/2012 | Casey |
| 2012/0268269 A1 | 10/2012 | Doyle |
| 2013/0005362 A1 | 1/2013 | Borghei |
| 2013/0013642 A1 | 1/2013 | Klein et al. |
| 2013/0143597 A1 | 6/2013 | Mitsuya et al. |
| 2013/0165069 A1 | 6/2013 | Nitta et al. |
| 2013/0196614 A1 | 8/2013 | Pahlevani |
| 2013/0235749 A1 | 9/2013 | Cho et al. |
| 2013/0262171 A1 | 10/2013 | Solodko et al. |
| 2013/0262497 A1 | 10/2013 | Case et al. |
| 2013/0295970 A1 | 11/2013 | Sheshadri et al. |
| 2014/0258827 A1 | 9/2014 | Gormish et al. |
| 2014/0302783 A1 | 10/2014 | Aiuto et al. |
| 2014/0357299 A1 | 12/2014 | Xu et al. |
| 2015/0073829 A1 | 3/2015 | Newman et al. |
| 2015/0080012 A1 | 3/2015 | Sprague et al. |
| 2015/0331919 A1 | 11/2015 | Freeland et al. |
| 2016/0044132 A1* | 2/2016 | Croft .............. G06Q 10/06311 |
| | | 709/225 |
| 2016/0104079 A1* | 4/2016 | Greenberg .......... G06F 3/04842 |
| | | 705/5 |
| 2016/0110458 A1 | 4/2016 | Colgrove et al. |
| 2017/0103103 A1* | 4/2017 | Nixon ................ G06F 16/256 |
| 2018/0024731 A1* | 1/2018 | Sanches ................ G06F 8/38 |
| | | 715/763 |

FOREIGN PATENT DOCUMENTS

| | | |
|---|---|---|
| EP | 2816513 | 12/2014 |
| EP | 2916276 | 9/2015 |
| WO | WO 2004/038548 | 5/2004 |

OTHER PUBLICATIONS

European Patent Office, "Search Report" in application No. 17204738.3-1231, dated May 16, 2018, 8 pages.
European Claims in application No. 17204738.3-1231, dated May 2018, 4 pages.
IBM, "Determining Business Object Structure," IBM, 2004, 9 pages.

\* cited by examiner

AUTOMATICALLY GENERATING GRAPHICAL DATA DISPLAYS BASED ON STRUCTURED DESCRIPTIONS

BENEFIT CLAIM

This application claims the benefit under 35 U.S.C. § 120 as a Continuation of application Ser. No. 15/701,579, filed Sep. 12, 2017, which claims the benefit under 35 U.S.C. § 119(e) of provisional application 62/434,358, filed Dec. 14, 2016, the entire contents of each of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

One technical field of the present disclosure is graphical user interfaces for computer displays. Another technical field is computer-implemented data visualization techniques. Another technical field is the structure and use of meta-descriptions of computer data displays.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graphical displays of data relating to the use or performance of software applications termed "dashboards" have come into wide use. However, traditionally, dashboards are custom-coded as part of a SaaS, desktop or mobile application. Modification of an attribute of the dashboard, such as the type of graphical widget (line chart, bar chart or histogram, for example), usually requires changing code and distributing a new version of the application. As a result, the appearance of the dashboards is relatively static and they cannot easily adapt to changes in the schema or ontology of the data source that drives display of data in the dashboards.

If notifications are provided from the app, they tend to be static as well, and not well connected to the graphical widgets within the dashboard. For example, the typical app notification simply indicates that some kind of change in the app occurred but is not associated with a specific dashboard or widget. Still another problem is that in the context of mobile computing devices, if data changes at a remote server, typically the server must transfer or push the data and the mobile device must determine which dashboard and/or widgets are to be used to render the data. Or, graphical widgets and the data are combined, as in HTML, which requires repetitive large data transfers over network connections that may have low bandwidth or subject to interruption. Therefore, there is a need within these fields for improved computer-implemented techniques for defining graphical data displays and notifications related to them.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

Figure 1:
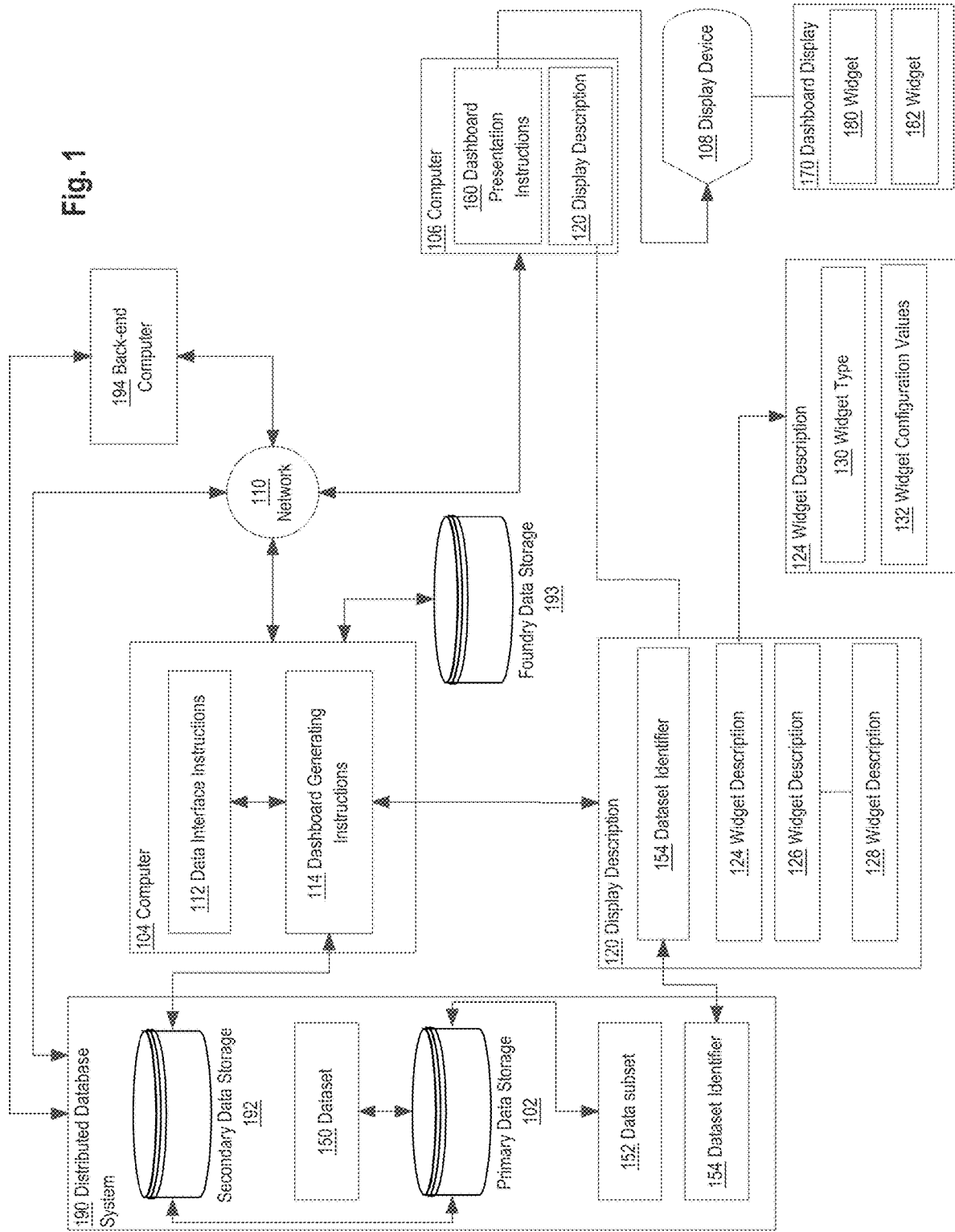
FIG. 1 illustrates an example networked computer system that may be used to implement one embodiment.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
3.0 EXAMPLE ALGORITHM FOR GENERATING DATA DISPLAYS AND EXAMPLE USER INTERFACE DISPLAYS
4.0 IMPLEMENTATION MECHANISMS—HARDWARE OVERVIEW
5.0 IMPLEMENTATION MECHANISMS—SOFTWARE OVERVIEW
6.0 OTHER ASPECTS OF DISCLOSURE 1.0 General Overview In one embodiment, the disclosure provides a data processing method comprising, using a first computer, in response to detecting a change in a data source: automatically generating a dataset comprising a subset of data from the data source, generating a unique dataset identifier, and associating the dataset identifier with the dataset in digital data storage; generating a display description that comprises: the dataset identifier; and for each particular graphical data display widget among one or more graphical data display widgets, instructions that specify a widget type, an order and one or more widget configuration values for the particular graphical data display widget; transmitting the display description to a second computer.

In another aspect, a data processing method comprises receiving, from a first computer at a second computer, a display description that comprises: a dataset identifier; and a plurality of instructions that specify a widget type, a display order value and one or more widget configuration values for each widget among one or more graphical data display widgets; the dataset having been generated using a subset of data from a data source, and associated in digital data storage with a unique dataset identifier, in response to detecting a change in a data source; fetching the dataset based on the dataset identifier; rendering the one or more graphical data display widgets according to each display order value, each widget type and the widget configuration values; displaying the plurality of graphical data display widgets in a display of the second computer.

The instructions can be configured, in some embodiments, so that execution using the second computer causes the second computer to fetch the dataset based on the dataset identifier and to render the plurality of graphical data display widgets. In an embodiment, the disclosure also provides a data processing method comprising receiving, from a first computer at a second computer, a display description that comprises a dataset identifier, a display order for a plurality of graphical data display widgets, and a plurality of instructions that specify a widget type and one or more widget configuration values for each widget among the plurality of graphical data display widgets; wherein the dataset was automatically generated using a subset of data from a data source, and associated in digital data storage with a unique dataset identifier, in response to detecting a change in a data source; fetching the dataset based on the dataset identifier; rendering the plurality of graphical data display widgets according to the display order, each widget type and the widget configuration values; and displaying the plurality of graphical data display widgets in a display of the second computer.

In one embodiment, a computer-implemented process is programmed to periodically check data sources and detect that changes have occurred to a particular data source. In response, the process causes generating a dataset, from the data source, that is suitable for display using one or more dashboards. Each dataset has a unique identifier. Concurrently, the process causes generating one or more descriptions of one or more dashboards. Each description consists of structured data that can be efficiently delivered over a network connection to a computing device that has been programmed with interpreting logic capable of reading and parsing the description and graphically rendering a dashboard based on the description; for example, JSON can be used to represent attributes of a dashboard. As part of the parsing, the unique identifier of the dataset is extracted, and the dataset is fetched using a request that contains the identifier.

Generating the descriptions is data-driven at multiple levels. For example, configurable parameter values identify the dataset; the type of dashboard; which columns in the dataset to use for values in the dataset and axis labels where appropriate; axis ranges; formats of dates or other data types; and others. Other data defines the titles, subtitles, and order of multiple widgets that appear in a scrollable display. Still other data can define one or more notifications that are associated with a particular widget, or at the level of all widgets. In one example embodiment, specific widgets display data relating to core usage metrics for applications such as active usage at various time buckets (hourly active users, for example), retention, popularity of apps or files, new users, session counts, session durations, counts of occurrences of "favorite" actions, and others.

Some embodiments are optimized in various ways for use with mobile computing devices. In one embodiment, once the description has been received and parsed at the mobile computing device, the dashboard and widgets can be updated merely by re-fetching an updated or refreshed version of the dataset using the same unique identifier.

In one embodiment, a dashboard graphical display of a mobile application executed using a mobile computing device comprises widgets, each of which can be a line graph, a key value chart, a bar graph or other display. Each dashboard is rendered using information stored in a display description file. The display description file includes information such as titles, subtitles, widget types and order, and other metadata about how the dashboard should be represented. Each widget is backed by a structured dataset comprising source data for a visualization. Each widget is linked to its backing structured dataset in the display description by a unique resource identifier of the dataset and one or more column names. For example, a line chart widget may include a resource identifier pointing to a location of data for rendering, and column names for an X axis and a Y axis. A relatively small number of widgets can be used to clearly express a large number of different datasets.

In an embodiment, alerts are automatically derived from dashboard data. For example, having a line chart in a dashboard automatically makes a push alert occur when new data is available for display in the chart.

The techniques disclosed herein reduce the amount of manual programming effort, memory, storage and CPU processing required to implement different kinds of dashboards. Parameterized dashboards as described herein permit substituting specific values into a display description template that can rapidly generate application-specific dashboard descriptions and deliver them to mobile devices. The disclosure also defines and describes a focused set of metrics that can indicate, in one example embodiment, whether a particular computer program application or product is successful in terms of user use, engagement and retention.

"Widget" as used herein is a broad term encompassing numerous possible embodiments, including a component of an interface (such as a webpage or computer application interface), that enables a user to perform a function and/or access a service; a control element in a graphical user interface, such as an element of interaction, such as a text input box, button, or a scroll bar; and/or a software component that a user interacts with in order to read, view, and/or edit presented information. Widgets include, but are not limited to, key value lists, menus (e.g., tools menus, context menus, pie menus), charts & graphs (e.g., pie charts, line charts, histograms, etc., including interactive charts and graphs), navigation panels, configuration panels, notification elements, buttons (radio buttons, check boxes, split buttons, cycle buttons), sliders (e.g., vertical or horizontal sliders), list boxes, spinners, drop down lists, toolbars, text boxes, combo boxes (e.g., a text box with a drop-down list), icons, tree view control elements, grid view control elements, links, tabs, scroll bars, labels, tooltips, balloon help, status and progress bards, info bars, windows (e.g., collapsible panels, accordion and modal windows, dialog boxes, frames, canvases, and bubble and cover flow elements).

2.0 Example Computer System Implementation

FIG. 1 illustrates an example networked computer system that may be used to implement one embodiment.

In the example of FIG. 1, a first computer 104 is communicatively coupled via network 110 to a second computer 106, a back-end computer 194, and to one or more data sources 102 and 192. In one embodiment, computer 104 is a server-class computer, back-end computer 194 is a back-end server-class computer, and computer 106 is a mobile computing device, but this configuration is not required in all embodiments and either computer may comprise a server computer, desktop computer, or laptop computer. The second computer 106 may be any of these as well as a tablet computer or smartphone. Each of first computer 104 and back-end computer 194 may comprise one or more virtual machine instances that are hosted or executed using a reconfigurable data center or cloud computing service. Further, first computer 104 and back-end computer 194 may be separate computers, the same computer, and may run the same or separate virtual machines.

Network 110 broadly represents any combination of a local area network, wide area network, internetwork, public internet and the like. In one embodiment, network 110 communicates to compatible network hardware interfaces and network stack software at each of the computers 104, 106, 194 using implementations of public standards and protocols such as TCP/IP.

Data source 102 may be any repository of computer-implemented data records and digitally stores a dataset 150, and a data subset 152 comprising a portion of the dataset 150 and having a unique dataset identifier 154. A data record may any computer-implemented data, such as a file, a data object, a database entry, a data message, or any other similar representation of computer-implemented data. In one embodiment, a data record may be represented as a file or entry in a file that is in a comma-separated value (CSV) format, or similar data set format. The embodiments described herein do not require any particular type or format of the data records provided by a data source. Thus, the data source 102 may comprise a file system, a relational database management system (RDBMS), a non-relational database, an object store, a distributed file system (DFS) such as a Hadoop distributed file system (HDFS), a Java Database Connectivity (JDBC) source, an email repository, data received through an application programming interface (API), a source code repository, a cloud-based data repository such as Amazon Simple Storage Service (S3), a message queue, or any other repository on one or more computing devices that contains data records. As depicted, data sources 102, 192, dataset 150, data subset 152, and unique data subset identifier 154 may be part of a distributed database system 190. In alternative embodiments, each may be separate or two or more may be part of distributed database system 190.

Computer 104 stores and executes an operating system and may host one or more application programs. In an embodiment, computer 104 hosts and executes data interface instructions 112 and dashboard generating instructions 114, which are configured or programmed to implement the functions that are further described in other sections herein.

In general, the data interface instructions 112 provide an interface to data source 102 and may be programmed to request the data source 102 to generate or form the data subset 152 and to generate and associate the dataset identifier 154 with the data subset. The data interface instructions 112 also may be programmed to detect one or more changes or updates to the dataset 150, to cause generating the data subset 152 in response to detecting such changes or updates, and to signal the dashboard generating instructions to generate a display description 120. In general, the dashboard generating instructions 114 are configured or programmed to respond to a signal from the data interface instructions 112 by creating the display description 120. Computer 104 may also store cleaned data and dashboard descriptions in second data source 192. Second data source 192 may comprise a file system, a relational database management system (RDBMS), a non-relational database, an object store, a distributed file system (DFS) such as a Hadoop distributed file system (HDFS), a Java Database Connectivity (JDBC) source, an email repository, data received through an application programming interface (API), a source code repository, a cloud-based data repository such as Amazon Simple Storage Service (S3), a message queue, or any other repository on one or more computing devices that contains data records. For example, in some embodiments, second data source 192 may include a DFS or HDFS, that is used to store the cleaned data source and dashboard description and may export these to a RDBMS for fast lookup and retrieval. The RDBMS to which the cleaned data source and dashboard descriptions are exported may be separate from both the distributed database system 190. In various embodiments, however, the RDBMS may be part of distributed database system 190.

Back-end computer 194 may store and execute instructions that pull data and dashboard descriptions, such as, for example, display description 120, from the second data source 192, or the RDBMS to which from the second data source 192 exports, and send those to computer 106.

The display description 120 comprises digitally stored metadata describing how to order and format one or more graphical data display widgets in a graphical user interface. As further described herein, another computing device such as computer 106 may use the display description 120 to render a graphical user interface, such as a data dashboard or other display, that includes graphical data display widgets as specified in the display description. In one embodiment, display description 120 comprises a dataset identifier 154, and one or more widget descriptions 124, 126, 128 of which three (3) are shown in FIG. 1 to illustrate a clear example. The widget descriptions 124, 126, and 128 may be in a particular order, and that order may define the order in which the widgets are displayed. In alternative embodiments, other approaches to determining order may be used, such as using an optional display order value for each widget described by widget descriptions 124, 126, and 128 to define the order of display. Other embodiments and execution cycles of the techniques herein may have fewer or more such widget descriptions in a display description 120. As further shown in FIG. 1, each of the widget descriptions 124, 126, 128 comprises a widget type 130 and one or more widget configuration values 132.

In an embodiment, the dataset identifier 154 identifies the data subset 152 and thereby serves as a reference to a set of data that the second computer 106 should render in a graphical user interface using the widgets. The display order in which second computer 106 should render the widgets described by widget descriptions 124, 126, and 128 may be determined by the order of appearance of the one or more widget descriptions 124, 126, 128. In each of the widget descriptions 124, 126, 128, the widget type 130 is a value that specifies one of a plurality of different graphical data display widgets that can be displayed. Examples of widgets that can be programmed in different embodiments and identified using the widget type 130 may include a line chart, bar chart, pie chart, histogram and the like, each of which may be identified using a different value of the widget type value. In an embodiment, the widget configuration values 132 may specify display parameters for a particular widget that are appropriate for the type of widget; examples include axis label values, axis ranges, numbers of lines, colors, scale factors, data display formats and units.

Computer 106 hosts or executes dashboard presentation instructions 160 which are programmed in part to receive, locally store and interpret a display description 120 received from back-end computer 194 and to render one or more widgets 180, 182 in a dashboard display on a computer display device 108. For purposes of illustrating a clear example, two (2) widgets 180, 182 are shown in FIG. 1 but other embodiments or instances of executing the techniques herein may include more or fewer widgets in the display 170. The term "dashboard display" is used for element 170 as one example but a display organized as a dashboard is not required and the widgets 180, 182 may form portions, panels, windows or other elements of any kind of graphical user interface.

Figure 2:
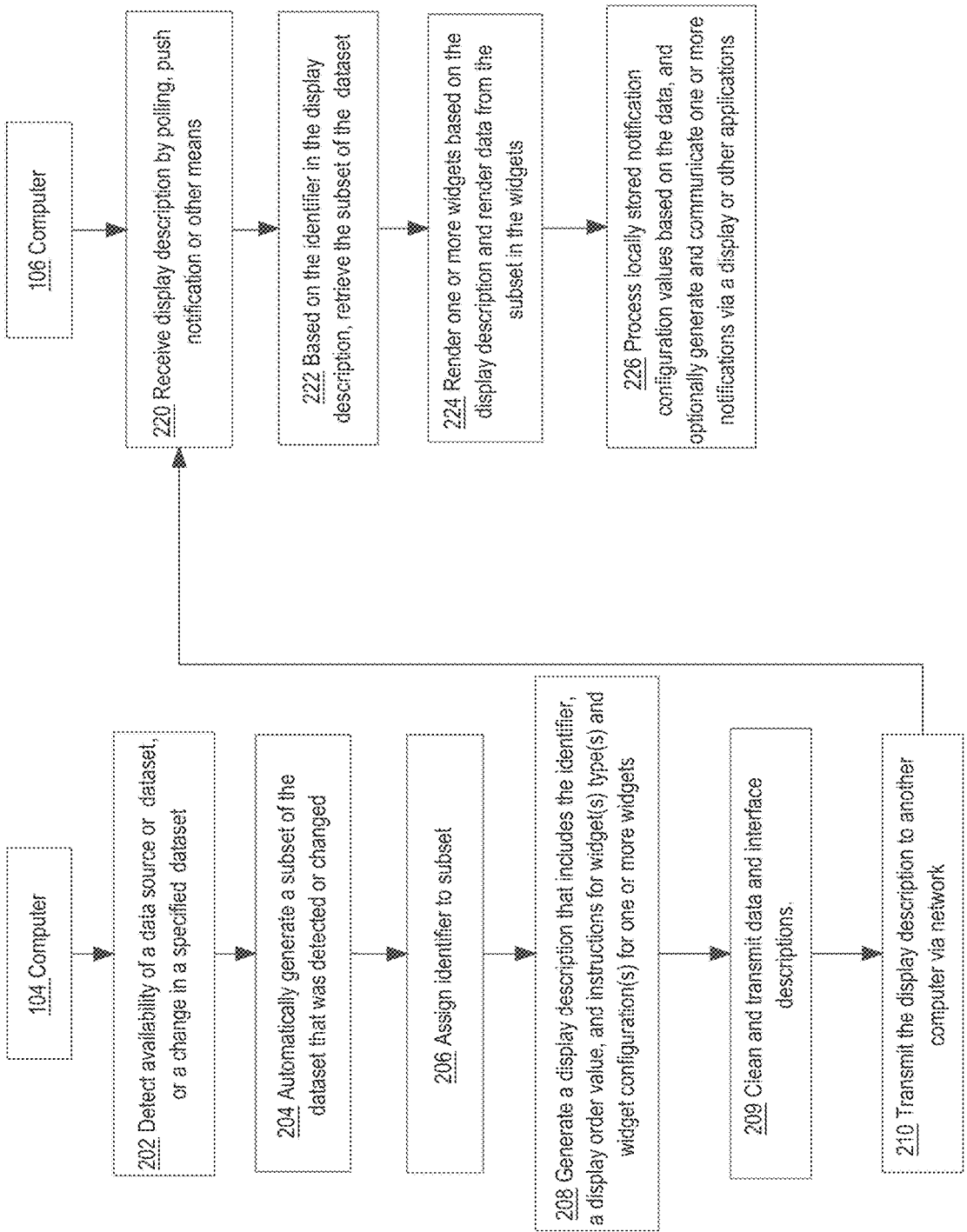
FIG. 2 illustrates an algorithm that may be programmed for execution using the computer system of FIG. 1 to implement one embodiment.

3.0 Example Algorithm for Generating Data Displays and Example User Interface Displays FIG. 2 illustrates an algorithm that may be programmed for execution using the computer system of FIG. 1 to implement one embodiment. FIG. 2 is intended to disclose an algorithm or functional description that may be used as a basis of writing computer programs to implement the functions that are described herein and which cause a computer to operate in the new manner that is disclosed herein. Further, FIG. 2 is provided to communicate such an algorithm at the same level of detail that is normally used, by persons of skill in the art to which this disclosure is directed, to communicate among themselves about plans, designs, specifications and algorithms for other computer programs of a similar level of complexity.

At block 202, a first computer such as computer 104 detects the availability of a data source or dataset, or a change in a specified dataset. As an example, computer 104 may be programmed with a daily or nightly cron job that inspects a specified database, table, or other data repository to determine whether a "last update" value, or the equivalent, has changed since a last inspection. In some embodiments, the dataset 150 comprises a plurality of different data tables, the data subset 152 comprises a single table, and a programmed job detects the presence of a new single-table data subset in a specified repository, logical storage location, or in a set of one or more particular digital data storage devices. Or, the first computer may receive a signal from another computer or data management system indicating that a new data source has been installed or rendered operational. Block 202 also may involve creating the data subset 152 in response to detecting a new table, using a predefined schema that specifies how to form datasets that represent widget data.

Jobs that execute to detect changes in a data source may execute on other computers separate from the first computer and may send signals or messages to the first computer, such as computer 104, indicating that data changed, was updated, or that new data or data sources are available. The particular instructions, computers or mechanisms used to perform block 202 are not critical; what is important is that a first computer receives data relating to a change or update of a specified dataset, or the availability of a data source or dataset.

At block 204, the process automatically generates a subset of the dataset that was detected or changed and in block 206 an identifier is assigned to the subset. For example, referring to FIG. 1, the first computer 104 may be programmed to request the data source 102 to create and store the data subset 152 based upon dataset 150, and to generate and assign a unique identifier 154 to the data subset. The unique identifier 154 may be a resource identifier or "rid". The data subset 152 may be any specified portion of the dataset 150 that is useful to display using the second computer 106. The data subset 152 may be a particular table, set of columns in a table, set of joined tables, set of changed or updated data, or any other range or portion of data. The data subset 152 does not need to be only the data that changed in the specified dataset.

At block 208, the process generates a display description. In one embodiment, a display description 120 as seen in FIG. 1 includes the identifier that was generated at block 206, a display order, and instructions for widget types and widget configurations for one or more graphical data display widgets. As discussed herein, display order may be determined programmatically, such as by order of appearance of the widget descriptions 124, 126, 128 in the display description 120, or, in alternative embodiments, may be determined based on ordinal values associated with widgets, ordinal values for widget types, etc. For example, the order of display of widgets may be based on the order of related widget in a JSON list, such as in the example below. The display description uses the identifier of block 206 as a reference to data that is to be displayed; therefore the display description does not contain the dataset 150 or subset 152, but a reference to the subset. Further, the display description does not contain executable instructions to render a particular graphical window, panel, graph, chart or other presentation elements; instructions to perform those functions are maintained at the second computer and executed there. Instead, the display description is a meta-description indicating what data to obtain for display, and how to format or structure the graphical data display widgets.

In an embodiment, the display description generated at block 208 comprises code in a markup language and packaged to transmit via a computer network to the second computer. In one embodiment, the display description comprises JSON code. TABLE 1 illustrates an example of a JSON blob that can be used as a display description:

TABLE 1

JSON EXAMPLE OF DISPLAY DESCRIPTION

```
{
    "dataSource": "%data_source%",
    "title": "%deployment_name% – %product_display_name%",
    "widgetContainers": [
        {
            "subtitle": "Number of users who accessed
            %product_display_name% each day.",
            "title": "Daily Active Users",
            "widgets": [
                {
                    "isStepChart": false,
                    "labelColumn": "label",
```

TABLE 1-continued

JSON EXAMPLE OF DISPLAY DESCRIPTION

```
                "lastValueSubtitle": "UNIQUE USERS",
                "showLastValue": true,
                "sqlStatement": "SELECT label,
                    MAX(active_count) AS value FROM
metrics_by_deployment WHERE stack_name = '%deployment_name%'
AND product = '%product%' AND umi LIKE
'%PRODUCT_USAGE.UNIQUE%:DAILY' AND current_date - date
(label) < 60 GROUP BY stack_name, product, label ORDER BY label",
                "type": "LINE_CHART",
                "valueColumn": "value",
                "widgetId": "2",
                "xAxis": {
                    "ticks": {
                        "minRotation": 45
                    },
                    "time": {
                        "displayFormats": {
                            "month": "MMM"
                        },
                        "parser": "YYYY-MM-DD",
                        "unit": "day",
                        "unitStepSize": 7
                    },
                    "type": "time"
                },
                "xAxisDurationInDays": 60,
                "xFillInterval": "daily"
            }
        ]
    },
    }
]
}
```

The example of TABLE 1 shows a single "Daily Active Users" widget as part of a dashboard, but it will be apparent that other widgets could be defined within the widgetContainers construct and appended to the JSON code given in the example. In the example, the attribute dataSource specifies a data source. The attribute "title" specifies a dashboard name and may be the combination of a deployment name, if appropriate, and the display name for a particular application program or product.

The widgetContainers construct defines a widget titled "Daily Active Users" with the subtitle "Number of users who accessed (the product name) each day. Values for the attributes "isStepChart", "labelColumn", "lastValueSubtitle", and "showLastValue" control the format of the widget and certain labeling features. The "sqlStatement" attribute, in this example, specifies a SQL database query that will return data from the data subset 152 that is appropriate for display in this type of widget, including appropriate grouping and sorting. The attribute "type" indicates that the widget is a line chart. The "valueColumn" attribute specifies a column name in the data subset that serves as the source of data values. The "widgetId" attribute is an identifier for the widget. The remaining values define axis display parameters, line display parameters such as step increments, units and display formats for various values such as dates.

At block 209, the process cleans and transmits the data and description to a computer view the network. For example, turning to FIG. 1, the data may not be in the form in which it will later needed. As such, computer 104 may clean that data. The cleaning of the data needed by computer 104 may take many forms. For example, if there are more columns than needed for the ultimate display of the data, the computer 104 may strip those unnecessary columns. In various embodiments, other types of cleaning may include reformatting data, renaming columns, and the like. Once the data is cleaned, then the data and display descriptions 120 may be sent to second data source 192 for storage and later retrieval. As discussed elsewhere herein, second data source 192 may export the cleaned data and the display descriptions 120 may be exported to a RBDMS for faster lookup and retrieval. At block 210, the process transmits the display description to another computer via a network. For example, in FIG. 1 back-end computer 194 transmits display description 120 to computer 106 via network 110. Block 220 of FIG. 2 indicates that the second computer receives the display description. The transmitting operation at block 210 and the receiving operation at block 220 may use polling, push notification or other means. The specific computer that initiates the data transmission and the particular mechanism of transmission is not critical. What is important is that the second computer obtains the data description.

At block 222, based on the dataset identifier in the display description, the second computer retrieves the subset of the dataset to display. Block 222 may comprise second computer 106 of FIG. 1 sending a database query over network 110 to the back-end computer 194 or directly to the data source 102. As seen in TABLE 1, the database query may comprise a structured query language (SQL) SELECT statement, which may be packaged in an HTTP request to the data source 102 or communicated using another form of database interfacing. The use of SQL is not required and data source 102 may be a no-SQL database or data repository.

At block 224, the process renders one or more widgets based on the display description and renders the data from the data subset in the widgets. For example, the dashboard presentation instructions 160 of the second computer 106 are programmed to parse and interpret the display description 120 to determine what number, type and format of graphical data display widgets to generate, and to call a graphics library, or other software functions to drive the computer display device 108 to display the specified widgets in a particular order and format, and to graphically display the data of the data subset in those widgets. The dashboard presentation instructions 160 are programmed to cause displaying the different types of widgets 180, 182 that can be designated by different values of the widget type 130 in a particular widget description 124. For example, if a particular value of widget type 130 indicates a line chart, then the dashboard presentation instructions 160 include a subroutine, method or other group of instructions that is configured to cause displaying the line chart according to the widget configuration values 132 and using the data subset 152 indicated by the dataset identifier 154 in the display description 120.

Figure 3:
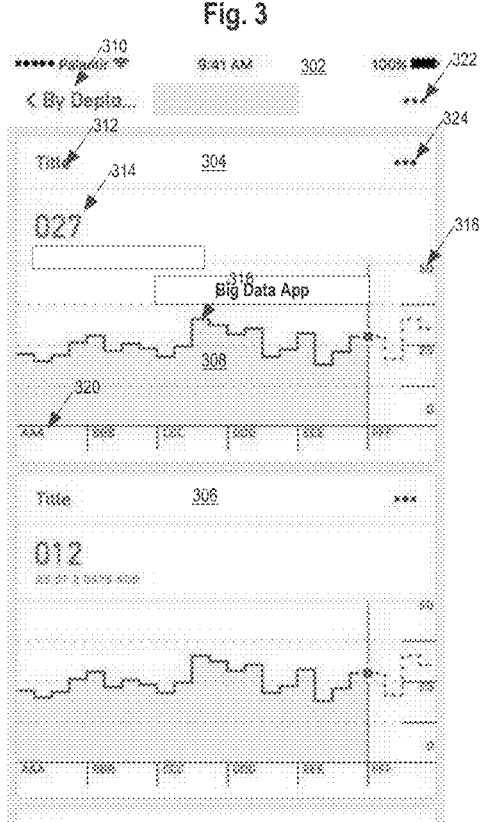
FIG. 3 illustrates an example graphical user interface that may be displayed using a mobile computing device in one embodiment, and showing a data dashboard having two (2) line chart widgets.
Figure 4:
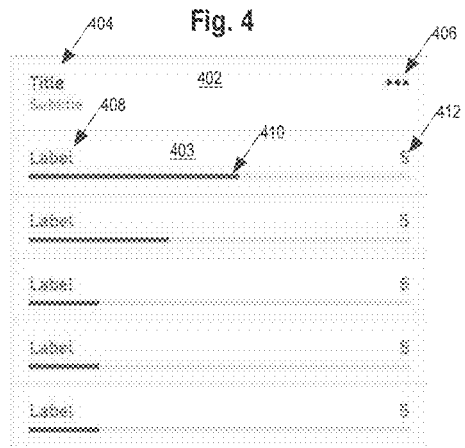
FIG. 4 illustrates a portion of an example graphical user interface that may be displayed using a mobile computing device in one embodiment, and showing a key value list widget.

FIG. 3 illustrates an example graphical user interface that may be displayed using a mobile computing device in one embodiment, and showing a data dashboard having two (2) line display widgets. FIG. 4 illustrates a portion of an example graphical user interface that may be displayed using a mobile computing device in one embodiment, and showing a key value list widget. In the example of FIG. 3, a graphical user interface 302 comprises a first widget 304 and a second widget 306. Two widgets 304, 306 are shown for purposes of illustrating a clear example but other embodiments, instances of execution and displays may have more or fewer widgets. The two widgets 304, 306 could be the first two widgets among a large number of widgets that is vertically scrollable in the interface 302. The interface 302 includes a tool selection link 322 which when selected causes transitioning the interface to a different display that comprises buttons, icons or other selectable display elements for activating, setting or working with configuration options. For example, in one embodiment the tool selection link 322 may cause displaying a configuration panel for visual notification signals ("notifications") that apply to all the widgets, as further described in another section herein.

The interface also includes a navigation link 310 that indicates the scope or category of the widgets 304, 306 that are then currently displayed; in the example of FIG. 3, the data in widgets 304, 306 show data for a single deployment of a computer program. The navigation link denotes "By Deployment", if selected, would show a list of other deployments from which to choose for display. In one embodiment, a deployment identifier 314 of widget 304 indicates a number or name of a particular deployment of a computer program application for which data is shown in the associated widget; the second widget 306 has a similar identifier.

In an embodiment, each widget 304, 306 comprises a title 312 that specifies the nature of the data that is displayed in the widget. Examples of titles include: Hourly Active Users (of the computer program application or deployment), Daily Active Users, Weekly Active Users, Monthly Active Users, Weekly Retention, Monthly Retention, Weekly Retention Triangle, Monthly Retention Triangle, Popular Times, Popular Days, New Users Per Hour, New Users Per Day, New Users Per Week, New Users Per Month, Sessions Per Hour, Hourly Average Session Duration, Daily Average Session Duration, Concurrent Users, Most Active Users, Daily Favorites, Popular Files, Popular Folders, Most Depended-on Datasets, and Most Favorited Files. One or more of the foregoing titles may, in various embodiments, be associated with a method, subroutine or other set of instructions that is programmed to render a widget 304, 306 using a particular algorithm that calculates the metric indicated by the title. For purposes of illustrating a clear example, the titles set forth above pertain to health metrics or performance metrics relevant to administration, maintenance and evaluation of computer program applications, but other embodiments may use titles and algorithms for other purposes.

For effective calculation of the metrics set forth above, a computer program application may define what constitutes active usage. Examples of active usage may include viewing a dashboard, viewing a home page, navigating among available files, and so on. In some cases, only an action that confers value upon an end user is part of a definition of active usage, and if a user session does not fulfill such a definition then the session is not counted as part of Active Usage metrics such as Weekly Active Users. The example titles set forth above may be associated with programmed methods, subroutines or instructions to calculate:

Hourly Active Users: Count of unique active users in a given hour.

Daily Active Users: Count of unique active users on a given day.

Weekly Active Users: Count of unique active users in a given week.

Monthly Active Users: Count of unique active users in a given week.

Weekly Retention: Of the unique users who use an application in a particular week 0, what percent return n weeks later. Users may be filtered to those who joined the application in the past m months; a typical value for m is 6.

Monthly Retention: Of the unique users who join in month 0, what percent return n months later. Users may be filtered to those who joined the application in the past six months, for example.

Weekly Retention Triangle: The weekly retention for each week's cohort of new users.

Monthly Retention Triangle: The monthly retention for each month's cohort of new users.

Popular Times: Distribution of sessions by hour of day for the last w weeks; an example value of w is 4. Also may be termed Hour of Day Usage Distribution.

Popular Days: Distribution of sessions by day of week for the last w weeks, for example, over the past four weeks. Also may be termed Day of Week Usage Distribution.

New Users Per Hour: Unique new active users in a given hour.

New Users Per Day: Unique new active users in a given day.

New Users Per Week: Unique new active users in a given week.

New Users Per Month: Unique new active users in a given month.

Sessions Per Hour: Count of unique sessions from active users in a given hour, where a session is defined as the span of time during which there is never more than a 15-minute gap in user-initiated log events, for example. Other embodiments may use time intervals or thresholds other than 15 minutes.

Hourly Average Session Duration: Average session length for sessions that started or ended within a given hour.

Daily Average Session Duration: Average session length for sessions that started or ended within a given day.

Concurrent Users: Count of unique active users who are active in a given minute of the day.

Most Active Users: Name and access count per user, ranked from highest to lowest.

Daily Favorites: Count of files signaled as "favorite" in a given day; used for applications that involve using or browsing files.

Popular Files: Name and access count per file, ranked from highest to lowest; used for applications that involve using or browsing files. Names may be encrypted.

Popular Folders: Name and access count per folder, ranked from highest to lowest; used for applications that involve using or browsing files. Names may be encrypted.

Most Depended-on Datasets: Name and access count per file, ranked from highest to lowest; used for applications that involve using datasets. Names may be encrypted.

Most Favorited Files: Name and favorite count per file, ranked from highest to lowest; used for applications that involve using or browsing files. Names may be encrypted.

Referring again to FIG. 3, in an embodiment, a particular widget 304 comprises a widget tool selection link 324 which when selected causes transitioning the interface to a different display that comprises buttons, icons or other selectable display elements for activating, setting or working with that particular widget. For example, in one embodiment the tool selection link 324 may cause displaying a configuration panel for visual notification signals ("notifications") that apply to widget 304, as further described in another section herein. Link 324 differs from link 322 in that the tools selected from link 324 are limited in scope to the associated widget 304.

Widget 304 depicts a line chart 308 having a data line 316, the magnitude of which is determined by values in the data subset 152 that is referenced in the display description 120. Line chart 308 further comprises a vertical axis 318 and horizontal axis 320 that may receive labels or range values, scaling and other display treatment based upon the configuration values that are specified in the display description 120. In this manner, the display description 120 drives selected aspects of the format of the line chart 308.

Widgets 304, 306 may be ordered in the user interface 302 based upon the display order in which the widget descriptions 124, 126, and 128 appeared in the display description 120. Thus, if the widget descriptions 124 and 126 appear in a particular order in display description 120, then corresponding widgets 304 and 306 would appear in that same order.

In an alternative embodiment, the order of display of the widgets may be determined by ordinal values in each widget definition 124, and the dashboard presentation instructions 160 may be programmed to identify and interpret the ordinal value as part of rendering widgets in the dashboard display 170. In the example of FIG. 3, widget 304 may have an ordinal value of "1" in a widget description 124 for that widget, and widget 306 may have an ordinal value of "2" in its widget description; as a result, widget 304 is displayed first and widget 306 is displayed second. In this alternative embodiment, in display description 120, the widget descriptions 124 for the widgets 304, 306 may be in any order, and may be preceded by other widget descriptions having different ordinal values, and yet still may be displayed in the order of the ordinal values, even if different than the order of appearance of widget descriptions 124, 126, and 128. As an example, a third widget could be defined in the display description 120 earlier in order than the widget descriptions 124, 126 for the widgets 304, 306, yet that third widget, if associated with a higher ordinal value, would appear after widgets 304, 306. Thus, an embodiment may be programmed for: receiving the display description comprising the dataset identifier, and for each particular graphical data display widget among two or more graphical data display widgets, the instructions that specify a widget type, one or more widget configuration values for the particular graphical data display widget, wherein the instructions comprise a set of first instructions of a first widget specify a first ordinal value that is higher in order than a second ordinal value in a set of second instructions of a second widget; sorting the first ordinal value and the second ordinal value in order; rendering the second widget first, and the first widget second, based on the first ordinal value and the second ordinal value.

Referring again to FIG. 4, as another example, a key value widget 402 may comprise a title 404 and widget tool selection link 406 that are generated and function in the same manner as previously described for widget 304 of FIG. 3. In an embodiment, the key value widget 402 comprises a plurality of key value displays 403, each comprising a label 408, a graphical bar 410, and a numeric value 412. The magnitude of the graphical bar 410 typically is proportional to the magnitude of the value 412, which is determined by specific values in the data subset 152 that is referenced in the display description 120 that includes a widget description for the key value widget.

In some embodiments, widgets such as those shown in FIG. 3, FIG. 4 may be generated and displayed, based on the data in the data subset 152, with respect to different groupings, levels or other organizational schemes that may be reflected by tag values or identifier values in the data. In an embodiment, activating the display of widgets at these different groupings, levels or other organizational schemes may occur using navigation menus that are programmed as part of the dashboard presentation instructions 160.

Figure 5:
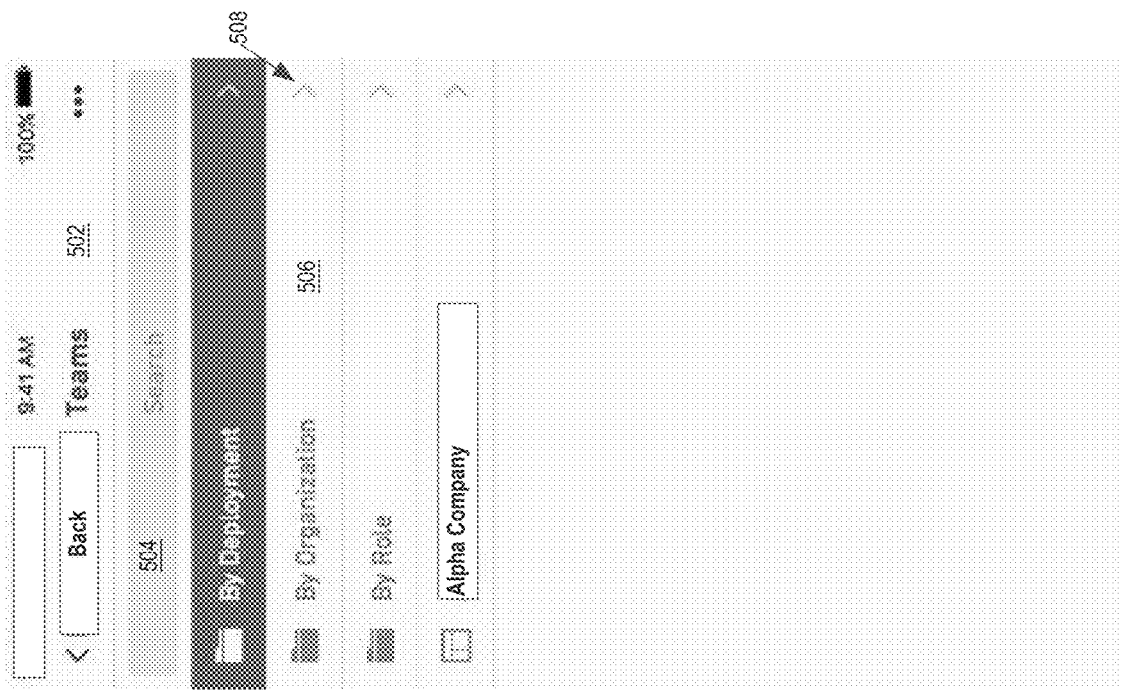
FIG. 5 illustrates an example graphical user interface that may be displayed using a mobile computing device in one embodiment, and showing a navigation panel.

FIG. 5 illustrates an example graphical user interface that may be displayed using a mobile computing device in one embodiment, and showing a navigation panel. A graphical user interface 502 may comprise a search field 504 that is programmed to receive keywords for searching; for example, the second computer may build a search list of terms in memory based upon the definitions of widgets that appear in the display description 120, and terms entered in search field 504 may cause returning a list of results specifying available widgets or categories of widgets. In an embodiment, a navigation list of interface 502 comprises one or more group selection bars 506, each associated with a data grouping at a different level or for a different category. Each of the selection bars 506 may include a title, a subtitle, a value for a key value, indentation, a favorite indicator, and other values in various embodiments.

Each of the selection bars 506 has a navigation icon 508 which, when selected via tapping or other user input causes displaying the widgets 304, 306, or any other widgets defined in the display description 120 that was received, based on organizing, aggregating and/or filtering the data of the data subset 152 using the grouping or level indicated by the selection bar that was selected. For example, selecting the BY DEPLOYMENT bar as the selection bar 506 is programmed to cause displaying widgets 304, 306 with data organized by different deployments of a computer program application, as opposed to aggregation or grouping by organization, role of user. Data also can be displayed for an entire enterprise or institution, as indicated by the selection bar 506 titled "Alpha Company" in this example.

Figure 6:
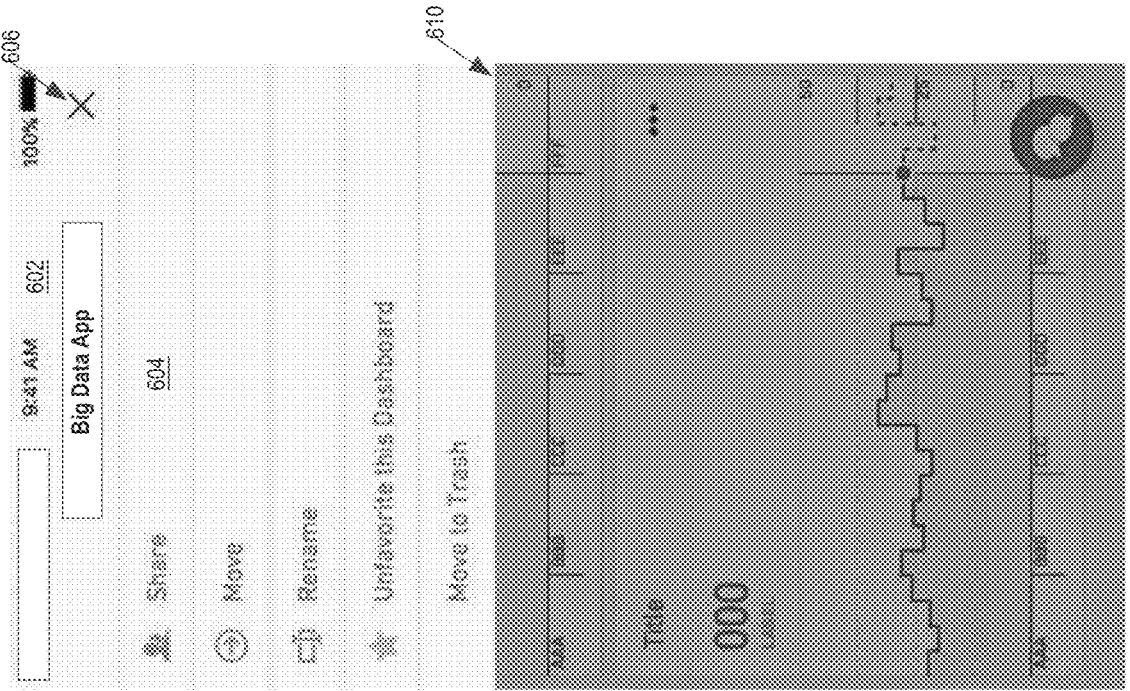
FIG. 6 illustrates an example graphical user interface that may be displayed using a mobile computing device in one embodiment, and showing a tools menu.

FIG. 6 illustrates an example graphical user interface that may be displayed using a mobile computing device in one embodiment, and showing a tools menu. In an embodiment, a graphical user interface 602 is displayed in response to selection of tool selection link 322 (FIG. 3). A tool list 604 is displayed and contains selectable links to operations for sharing a widget, moving a widget in the screen display 302, renaming a widget, selecting or de-selecting a widget as a favorite, and deleting the widget from the display. A first widget 610 is redisplayed in a lower screen position and grayed out or with other special visual treatment to indicate that interaction with that widget is not possible when the tool list 604 is displayed. Interface 602 also shows a cancel icon 606 in the position of the tool selection link 322; selecting the cancel icon causes canceling the tool selection and redisplaying the widget 610 in normal position and without highlighting or other special visual treatment.

Referring again to FIG. 3, at block 226, the process optionally processes locally stored notification configuration values based on the data, and optionally generates and communicates one or more notifications via a display or other applications. In an embodiment, dashboard presentation instructions 160 are programmed to maintain stored digital values indicating a configuration of device notifications at a plurality of different logical levels, and to generate and cause transmitting a notification when the condition of a configured notification are met at any of the levels. Notification, in this context, refers to any form of message, signal or alert, including in-application messages, text messages, e-mail messages, audible sounds or other visual indications.

Figure 8:
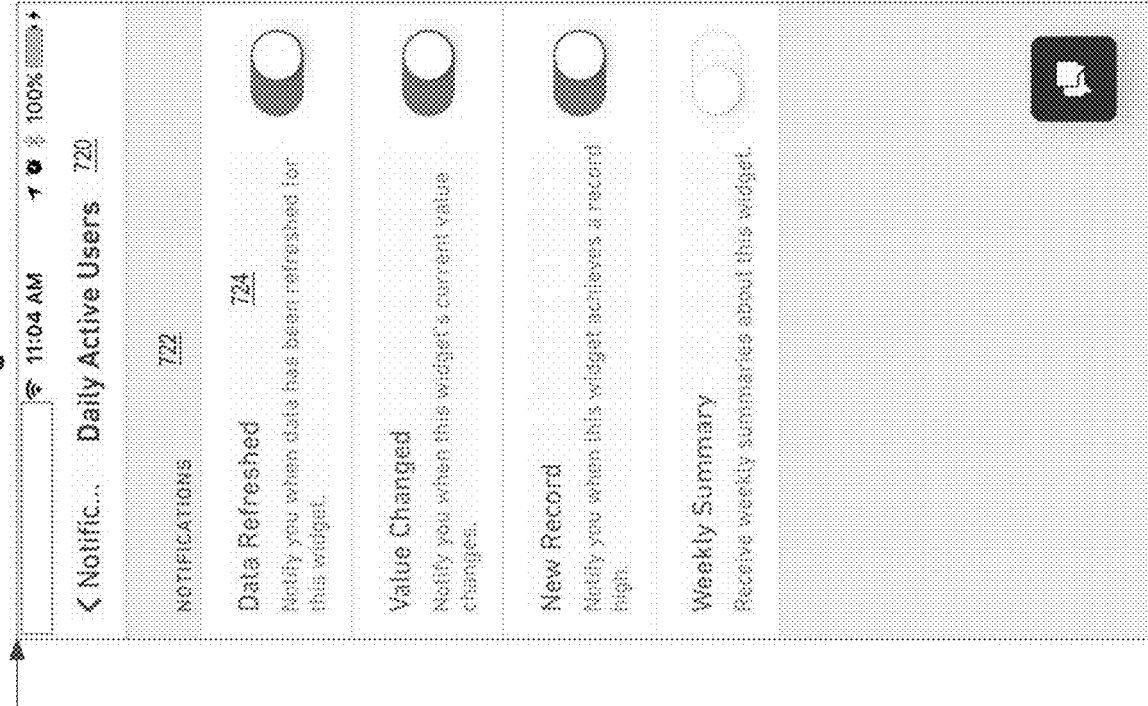
FIG. 8 illustrates an example graphical user interface that may be displayed using a mobile computing device in one embodiment, and showing a configuration panel for configuring a second level of notifications.
Figure 7:
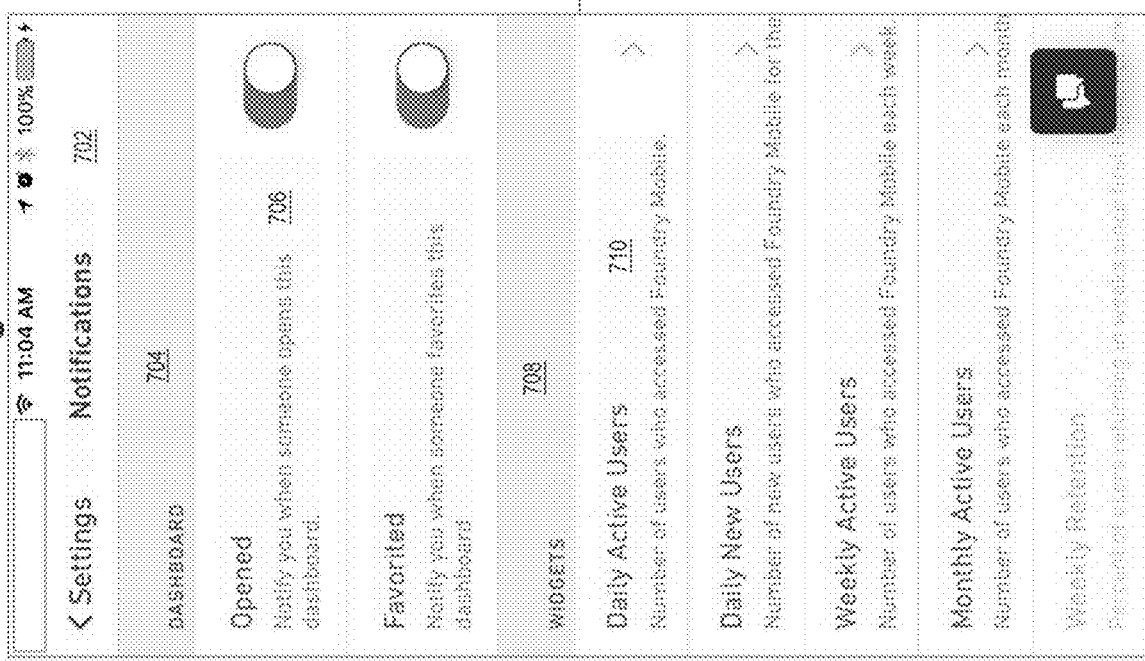
FIG. 7 illustrates an example graphical user interface that may be displayed using a mobile computing device in one embodiment, and showing a configuration panel for configuring a first level of notifications.

In one embodiment, notifications can be configured and triggered with respect to a dashboard consisting of one or more widgets, and also at a level associated with individual widgets. FIG. 7 illustrates an example graphical user interface that may be displayed using a mobile computing device in one embodiment, and showing a configuration panel for configuring a first level of notifications. FIG. 8 illustrates an example graphical user interface that may be displayed using a mobile computing device in one embodiment, and showing a configuration panel for configuring a second level of notifications. Referring first to FIG. 7, in an embodiment, a graphical user interface 702 comprises a dashboard notification list 704 and a widget notification list 708. The dashboard notification list 704 comprises one or more notification switches 706 that may be toggled to turn notifications on or off for specified notification conditions. In the example of FIG. 7, a first switch 706 is titled Opened and when activated causes generating a notification when someone opens the associated dashboard, and a second switch is titled Favorited and causes generating a notification when someone marks the dashboard as a favorite. "Someone," in this context, may mean the current user or another user of a different second computer 106 that is executing another instance of the same application.

The widget notification list 708 comprises a plurality of selectable list items 710 that cause navigating to a widget notification panel of the type seen in FIG. 8. Each of the selectable list items 710 includes a chevron indicator (">") to inform the user that selecting that selectable list item will cause displaying a separate panel for turning relevant notifications on or off. For example, selecting the list item 710 titled "Daily Active Users" causes dashboard presentation instructions 160 to transition the display of the second computer 106 to the form shown in FIG. 8.

Referring now to FIG. 8, in one embodiment, a widget-level notification panel 720 comprises a widget-level notifications list 722 having one or more notification switches 724 that may be toggled to turn notifications on or off for specified notification conditions pertaining to the Daily Active Users widget, in this example. FIG. 7 shows four (4) example switches 724 titled Data Refreshed, Value Changed, New Record and Weekly Summary, but other embodiments and other widgets may have switches that are associated with different triggering conditions. As an example, activating the first switch 724 titled Data Refreshed causes generating a notification when data has been refreshed for the Daily Active Users widget. The triggering condition specified in text in association with a particular switch 724 is programmed as part of the dashboard presentation instructions 160 to cause generating a notification when the instructions detect that the triggering condition is met.

4.0 Implementation Mechanisms—Hardware Overview

Figure 9:
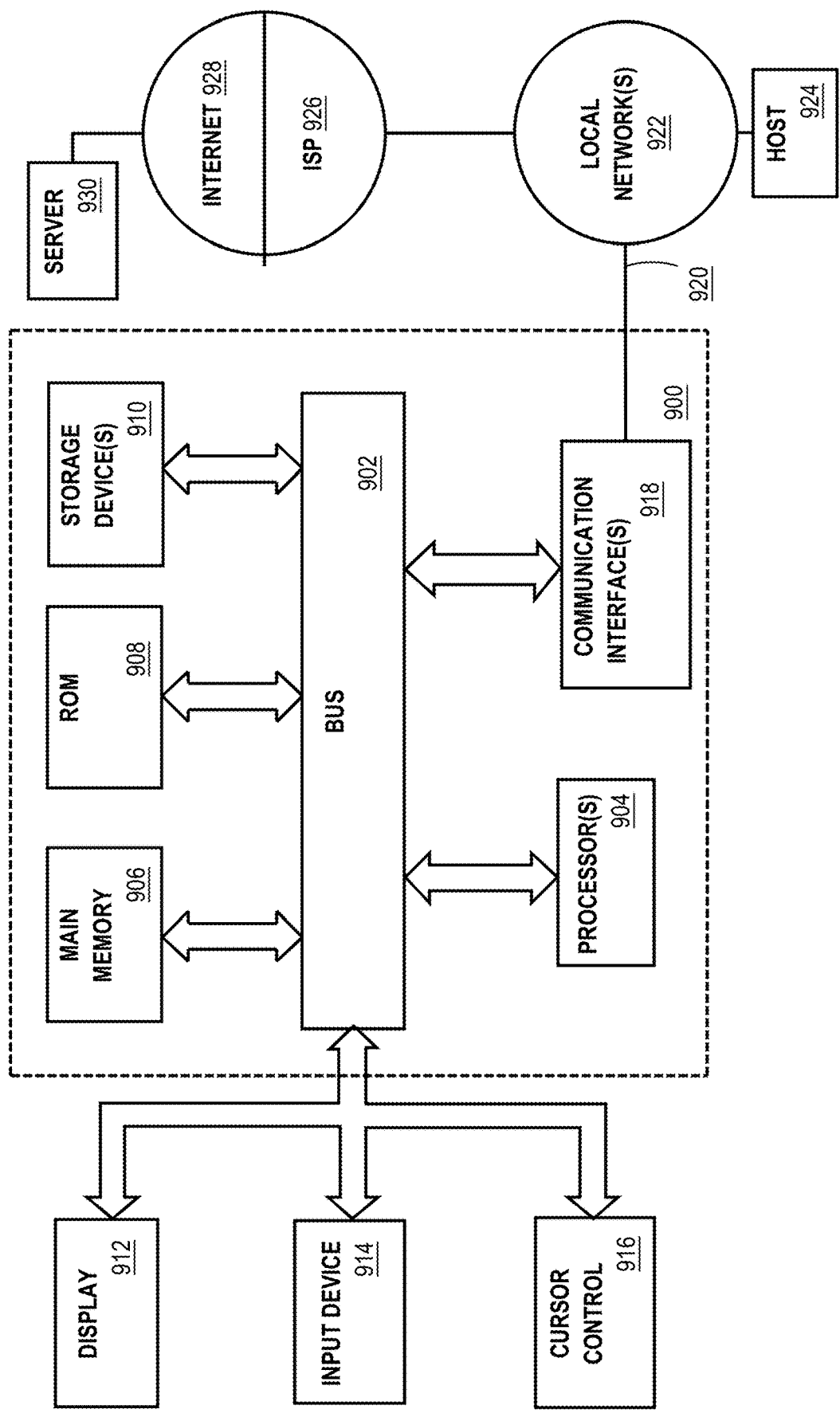
FIG. 9 is a block diagram of a computing device in which the example embodiment(s) of the present invention may be embodied.

Referring now to FIG. 9, it is a block diagram that illustrates a computing device 900 in which the example embodiment(s) of the present invention may be embodied. Computing device 900 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 900 may include a bus 902 or other communication mechanism for addressing main memory 906 and for transferring data between and among the various components of device 900.

Computing device 900 may also include one or more hardware processors 904 coupled with bus 902 for processing information. A hardware processor 904 may be a general purpose microprocessor, a system on a chip (SoC), or other processor.

Main memory 906, such as a random access memory (RAM) or other dynamic storage device, also may be coupled to bus 902 for storing information and software instructions to be executed by processor(s) 904. Main memory 906 also may be used for storing temporary variables or other intermediate information during execution of software instructions to be executed by processor(s) 904.

Software instructions, when stored in storage media accessible to processor(s) 904, render computing device 900 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 900 also may include read only memory (ROM) 908 or other static storage device coupled to bus 902 for storing static information and software instructions for processor(s) 904.

One or more mass storage devices 910 may be coupled to bus 902 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 910 (e.g., the main hard disk for the device) stores a body of program and data for directing operation of the computing device, including an operating system, user application programs, driver and other support files, as well as other data files of all sorts.

Computing device 900 may be coupled via bus 902 to display 912, such as a liquid crystal display (LCD) or other electronic visual display, for displaying information to a computer user. In some configurations, a touch sensitive surface incorporating touch detection technology (e.g., resistive, capacitive, etc.) may be overlaid on display 912 to form a touch sensitive display for communicating touch gesture (e.g., finger or stylus) input to processor(s) 904.

An input device 914, including alphanumeric and other keys, may be coupled to bus 902 for communicating information and command selections to processor 904. In addition to or instead of alphanumeric and other keys, input device 914 may include one or more physical buttons or switches such as, for example, a power (on/off) button, a "home" button, volume control buttons, or the like.

Another type of user input device may be a cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

While in some configurations, such as the configuration depicted in FIG. 9, one or more of display 912, input device 914, and cursor control 916 are external components (i.e., peripheral devices) of computing device 900, some or all of display 912, input device 914, and cursor control 916 are integrated as part of the form factor of computing device 900 in other configurations.

Functions of the disclosed systems, methods, and modules may be performed by computing device 900 in response to processor(s) 904 executing one or more programs of software instructions contained in main memory 906. Such software instructions may be read into main memory 906 from another storage medium, such as storage device(s) 910. Execution of the software instructions contained in main memory 906 cause processor(s) 904 to perform the functions of the example embodiment(s).

While functions and operations of the example embodiment(s) may be implemented entirely with software instructions, hard-wired or programmable circuitry of computing device 900 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more software instructions to processor(s) 904 for execution. For example, the software instructions may initially be carried on a magnetic disk or solid-state drive of a remote computer. The remote computer can load the software instructions into its dynamic memory and send the software instructions over a telephone line using a modem. A modem local to computing device 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor(s) 904 retrieves and executes the software instructions. The software instructions received by main memory 906 may optionally be stored on storage device(s) 910 either before or after execution by processor(s) 904.

Computing device 900 also may include one or more communication interface(s) 918 coupled to bus 902. A communication interface 918 provides a two-way data communication coupling to a wired or wireless network link 920 that is connected to a local network 922 (e.g., Ethernet network, Wireless Local Area Network, cellular phone network, Bluetooth wireless network, or the like). Communication interface 918 sends and receives electrical, electromagnetic, or optical signals that carry digital data streams representing various types of information. For example, communication interface 918 may be a wired network interface card, a wireless network interface card with an integrated radio antenna, or a modem (e.g., ISDN, DSL, or cable modem).

Network link(s) 920 typically provide data communication through one or more networks to other data devices. For example, a network link 920 may provide a connection through a local network 922 to a host computer 924 or to data equipment operated by an Internet Service Provider (ISP) 926. ISP 926 in turn provides data communication services through the world wide packet data communication network now commonly referred to as the "Internet" 928. Local network(s) 922 and Internet 928 use electrical, electromagnetic or optical signals that carry digital data streams. The signals through the various networks and the signals on network link(s) 920 and through communication interface(s) 918, which carry the digital data to and from computing device 900, are example forms of transmission media.

Computing device 900 can send messages and receive data, including program code, through the network(s), network link(s) 920 and communication interface(s) 918. In the Internet example, a server 930 might transmit a requested code for an application program through Internet 928, ISP 926, local network(s) 922 and communication interface(s) 918.

The received code may be executed by processor 904 as it is received, and/or stored in storage device 910, or other non-volatile storage for later execution.

5.0 Implementation Mechanisms—Software Overview

Figure 10:
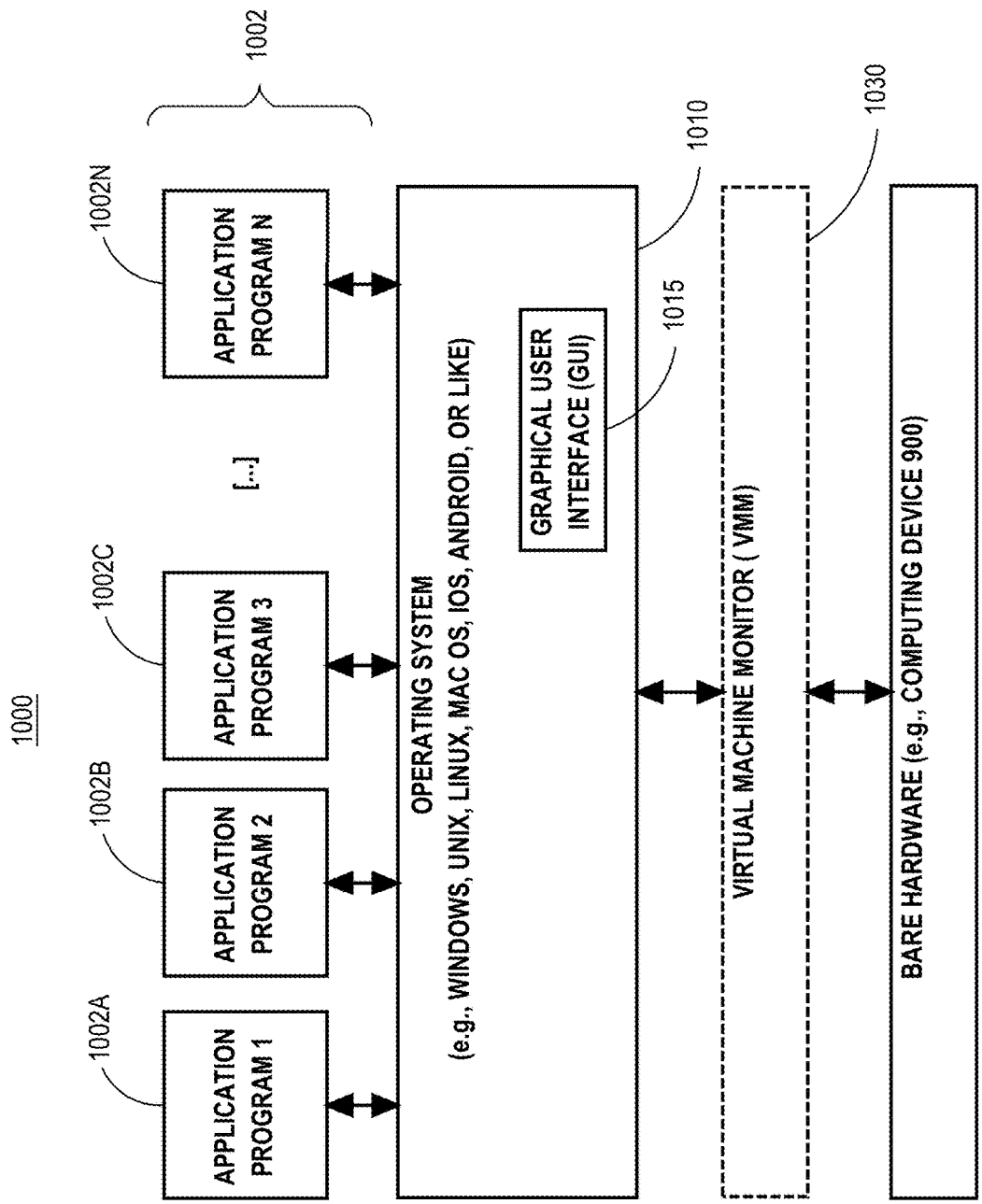
FIG. 10 is a block diagram of a software system for controlling the operation of the computing device.

FIG. 10 is a block diagram of a software system 1000 that may be employed for controlling the operation of computing device 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computing device 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on device 1000 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of device 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the device 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of device 300 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
using a first computer, in response to detecting a change in data stored in a data source:
automatically generating a dataset comprising a subset of data from the data source based upon the detected change in the data, generating a unique dataset identifier, and associating the unique dataset identifier with the dataset in digital data storage;
generating a display description, wherein the display description comprises:
the unique dataset identifier; and
for each particular graphical data display widget among one or more graphical data display widgets, instructions that specify a widget type, an order and one or more widget configuration values for the particular graphical data display widget;
formatting the dataset to conform with a data format defined by the one or more widget configuration values of the one or more graphical data display widgets, and storing the formatted dataset and the associated unique dataset identifier in the data source;
wherein the formatted dataset comprises data values representing content to be presented within the one or more graphical data display widgets;
wherein the data format defined by the one or more widget configuration values comprises at least one of a data format for one or more columns that make up the content, data values that make up the content, or names for the set of columns that make up the content; and
transmitting the display description to a second computer.

2. The method of claim 1, wherein the widget type of the particular data display widget specifies one of: a line chart, a key value chart, or a bar chart.

3. The method of claim 1, wherein the instructions of the display description further comprise a structured query language (SQL) statement that specifies a database query configured to retrieve data for display using the particular graphical data display widget.

4. The method of claim 1, wherein the widget type of the particular data display widget specifies a line chart having an X axis and a Y axis, and wherein the instructions of the display description further comprise a structured query language (SQL) statement that specifies a database query configured to retrieve data for display using the particular graphical data display widget and including a first column value of the dataset for use in rendering the X axis and a second column value of the dataset for use in rendering the Y axis.

5. The method of claim 1 wherein the instructions of the display description specify one or more of a title, subtitle, format, labeling features, grouping and sorting of data, axis display parameters, line display parameters, units and display formats.

6. The method of claim 1, further comprising generating the display description comprising the unique dataset identifier, and for each particular graphical data display widget among two or more graphical data display widgets, the instructions that specify a widget type, one or more widget configuration values for the particular graphical data display widget, wherein the instructions comprise a set of first instructions of a first widget specify a first ordinal value that is higher in order than a second ordinal value in a set of second instructions of a second widget.

7. The method of claim 1, further comprising:
using the first computer to detect the change in the data source by detecting a new single table in a particular data storage system;
automatically generating the subset of data from the data source by applying a predetermined schema to the new single table that was detected.

8. A method comprising:
receiving, from a first computer at a second computer, a display description that comprises:
a unique dataset identifier; and
a plurality of instructions that specify a widget type, a display order and one or more widget configuration values for each widget among one or more graphical data display widgets;
wherein the unique dataset identifier identifies a dataset having been generated and formatted to conform with a data format defined by the one or more widget configuration values of the one or more graphical data display widgets, using a subset of data from a data source, and is associated in digital data storage with the unique dataset identifier, in response to detecting a change in data stored in the data source;
wherein the dataset comprises data values representing content to be presented within the one or more graphical data display widgets;
wherein the data format defined by the one or more widget configuration values comprises at least one of a data format for one or more columns that make up the content, data values that make up the content, or names for the set of columns that make up the content;
fetching the dataset based on the unique dataset identifier;
rendering the one or more graphical data display widgets according to each display order, each widget type and the widget configuration values; and
displaying the one or more of graphical data display widgets in a display of the second computer.

9. The method of claim 8, further comprising rendering the one or more graphical data display widgets as a line chart, a key value chart, or a bar chart based upon the widget type.

10. The method of claim 8, further comprising:
obtaining, from the instructions of the display description, a structured query language (SQL) statement;
submitting the SQL statement as a database query to the data source;
receiving from the data source particular data for display using the particular graphical data display widget.

11. The method of claim 8, wherein the widget type of the particular data display widget specifies a line chart having an X axis and a Y axis; the method further comprising:
obtaining, from the instructions of the display description, a structured query language (SQL) statement;
submitting the SQL statement as a database query to the data source;
receiving from the data source particular data for display using the particular graphical data display widget, including a first column value of the dataset for use in rendering the X axis and a second column value of the dataset for use in rendering the Y axis.

12. The method of claim 8 wherein the instructions of the display description specify one or more of a title, subtitle, format, labeling features, grouping and sorting of data, axis display parameters, line display parameters, units and display formats.

13. The method of claim 8, further comprising:
receiving the display description comprising the unique dataset identifier, and for each particular graphical data display widget among two or more graphical data display widgets, the instructions that specify a widget type, one or more widget configuration values for the particular graphical data display widget, wherein the instructions comprise a set of first instructions of a first widget specify a first ordinal value that is higher in order than a second ordinal value in a set of second instructions of a second widget;
sorting the first ordinal value and the second ordinal value in order;
rendering the second widget first, and the first widget second, based on the first ordinal value and the second ordinal value.

14. The method of claim 8, further comprising:
generating and displaying a graphical user interface comprising a dashboard notification list and a widget notification list;
wherein the dashboard notification list comprises one or more dashboard notification switches that are programmed to receive input to toggle corresponding notifications on or off for specified notification conditions;
wherein the widget notification list comprises a plurality of selectable list items that are programmed to cause navigating the graphical user interface to a widget notification panel;
generating and displaying, a widget-level notification panel comprising a widget-level notifications list having one or more widget notification switches that are programmed to receive input to toggle corresponding notifications on or off for specified notification conditions pertaining to a specified widget;
determining that a programmed triggering condition has occurred for a particular dashboard notification switch or widget notification switch that is toggled on;
generating a notification in response to determining that a programmed triggering condition has occurred for a particular switch that is toggled on.

* * * * *